(12) United States Patent
Chuang et al.

(10) Patent No.: US 11,850,823 B2
(45) Date of Patent: Dec. 26, 2023

(54) ELECTRONIC DEVICE AND METHOD FOR MANUFACTURING THE SAME

(71) Applicant: InnoLux Corporation, Miao-Li County (TW)

(72) Inventors: Chao-Li Chuang, Miao-Li County (TW); Hsin-Wei Huang, Miao-Li County (TW); Ming-Chi Guo, Miao-Li County (TW); Chih-Yen Lu, Miao-Li County (TW); Kuan-Chou Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 53 days.

(21) Appl. No.: 16/851,618

(22) Filed: Apr. 17, 2020

(65) Prior Publication Data

US 2020/0353721 A1    Nov. 12, 2020

(30) Foreign Application Priority Data

May 10, 2019    (CN) .......................... 201910389289.3

(51) Int. Cl.
*B32B 17/06*    (2006.01)
*G02F 1/1333*    (2006.01)
(Continued)

(52) U.S. Cl.
CPC ............... *B32B 17/06* (2013.01); *B32B 7/12* (2013.01); *B32B 9/04* (2013.01); *B32B 33/00* (2013.01); *B32B 37/12* (2013.01); *G02F 1/1333* (2013.01)

(58) Field of Classification Search
CPC ............. Y10T 428/14; Y10T 428/1414; Y10T 428/1452; Y10T 428/1462;
(Continued)

(56) References Cited

U.S. PATENT DOCUMENTS

2002/0090516 A1* 7/2002 Loshak ................... G02B 1/10
                                                        428/412
2011/0268978 A1* 11/2011 Watanabe ............. C08L 23/142
                                                        428/500

(Continued)

FOREIGN PATENT DOCUMENTS

CN        201465450 U      5/2010
CN        202297391 U      7/2012
(Continued)

OTHER PUBLICATIONS

Machine translation (Espacenet) of KR 10-1785380 B1. Translated Feb. 23, 2023. (Year: 2023).*
(Continued)

*Primary Examiner* — Maria V Ewald
*Assistant Examiner* — Ethan A. Utt
(74) *Attorney, Agent, or Firm* — McClure, Qualey & Rodack, LLP

(57) ABSTRACT

An electronic device is provided. The electronic device includes a display, a substrate, and an anti-explosion layer. The substrate is disposed on the display. The anti-explosion layer is disposed between the substrate and the display, and the anti-explosion layer has a tensile strength in a range from 10 MPa to 30 MPa.

17 Claims, 8 Drawing Sheets

(51) Int. Cl.
  *B32B 9/04*     (2006.01)
  *B32B 7/12*     (2006.01)
  *B32B 33/00*    (2006.01)
  *B32B 37/12*    (2006.01)

(58) Field of Classification Search
  CPC ......... Y10T 428/1471; Y10T 428/1476; Y10T 428/24355; Y10T 428/24364; Y10T 428/24942; Y10T 428/24983; Y10T 428/26; Y10T 428/266; Y10T 428/269; Y10T 428/28; Y10T 428/2809; Y10T 428/2813; Y10T 428/2817; Y10T 428/2826; Y10T 428/2839; Y10T 428/2848; Y10T 428/2852; Y10T 428/287; Y10T 428/2878; Y10T 428/2883; Y10T 428/2887; Y10T 428/2891; Y10T 428/2896; Y10T 428/31507; Y10T 428/31616; Y10T 428/31623; Y10T 428/31645; Y10T 428/31649; Y10T 428/31721; Y10T 428/31786; Y10T 428/31797; Y10T 428/31855; Y10T 428/31909; Y10T 428/31928; Y10T 428/31935; B32B 3/00; B32B 3/02; B32B 7/00; B32B 7/02; B32B 7/22; B32B 7/023; B32B 7/04; B32B 7/12; B32B 17/00; B32B 17/06; B32B 17/10; B32B 17/10005; B32B 17/1055; B32B 17/10733; B32B 17/10743; B32B 17/10752; B32B 17/10779; B32B 27/00; B32B 27/04; B32B 27/06; B32B 27/08; B32B 27/16; B32B 27/28; B32B 27/281; B32B 27/30; B32B 27/302; B32B 27/308; B32B 27/36; B32B 27/365; B32B 27/38; B32B 2307/40; B32B 2307/412; B32B 2307/414; B32B 2307/50; B32B 2307/51; B32B 2307/54; B32B 2457/00; B32B 2457/20; B32B 2457/202; B32B 2457/204; B32B 2457/206; B32B 2457/208; C09J 7/00; C09J 7/20; C09J 7/201; C09J 7/22; C09J 7/24; C09J 7/25; C09J 7/255; C09J 7/29; C09J 7/30; C09J 7/35; C09J 7/40; C09J 7/401; C09J 7/405; C09J 9/00; C09J 2203/318; C09J 2301/30; C09J 2301/312; G02B 1/00; G02B 1/04; G02F 1/00; G02F 1/0009; G02F 1/0063; G02F 1/009; G02F 1/13; G02F 1/1306; G02F 1/133; G02F 1/1333; G02F 1/133302
  USPC ... 428/40.1, 40.4, 41.3, 41.5, 41.7, 41.8, 77, 428/78, 141, 142, 212, 217, 220, 332, 428/337, 339, 343, 345, 346, 347, 349, 428/352, 354, 355 R, 355 EP, 355 EN, 428/355 BL, 355 CN, 355 AC, 355 N, 428/412, 426, 427, 428, 430, 435, 441, 428/442, 446, 451, 437.5, 480, 483, 500, 428/515, 520, 522
  See application file for complete search history.

(56) References Cited

U.S. PATENT DOCUMENTS

| 2017/0068364 | A1 |   | 3/2017 | Xu et al. |
| 2018/0059454 | A1 | * | 3/2018 | Shin ................ G02F 1/133308 |
| 2019/0144723 | A1 | * | 5/2019 | Akiyama .............. C09J 153/02 |
| | | | | 428/172 |

FOREIGN PATENT DOCUMENTS

| CN | 103832012 A | | 6/2014 | |
| CN | 105137635 A | | 12/2015 | |
| CN | 208027213 U | | 10/2018 | |
| JP | 2015067742 A | * | 4/2015 | |
| KR | 101785380 B1 | * | 10/2017 | ............ C09J 133/00 |
| WO | WO-2017212736 A1 | * | 12/2017 | ............ B32B 27/00 |

OTHER PUBLICATIONS

Machine translation (Espacenet) of JP 2015-067742 A. Translated Sep. 7, 2023. (Year: 2023).*
Chinese language office action dated Jan. 20, 2013, issued in application No. CN 201910389289.3.

* cited by examiner

ELECTRONIC DEVICE AND METHOD FOR MANUFACTURING THE SAME

CROSS REFERENCE TO RELATED APPLICATIONS

This application claims priority of Chinese Patent Application 201910389289.3, filed on May 10, 2019, the entirety of which are incorporated by reference herein.

BACKGROUND

Technical Field

The present disclosure relates to an electronic device and a method for manufacturing the electronic device, and in particular it relates to an electronic device including an anti-explosion structure and a method for manufacturing such an electronic device.

Description of the Related Art

Electronic products equipped with display panels have become indispensable necessities in modern society. With the flourishing development of these portable electronic products, consumers have high expectations regarding the quality, functionality, and price of them.

Display panels are widely used in various spaces and environments, and safety requirements are gradually being taken seriously. However, existing electronic devices having display panels have not been satisfactory in all respects. Therefore, improvement of the performance of such electronic devices is still one of the goals that the industry is currently aiming at.

SUMMARY

In accordance with some embodiments of the present disclosure, an electronic device is provided. The electronic device includes a display, a substrate, and an anti-explosion layer. The substrate is disposed on the display. The anti-explosion layer is disposed between the substrate and the display, and the anti-explosion layer has a tensile strength in a range from 10 MPa to 30 MPa.

In accordance with some other embodiments of the present disclosure, a method for manufacturing an electronic device is provided. The method includes the following steps: providing a substrate, and performing a first pre-processing step on the substrate; providing an anti-explosion layer and a display, wherein the anti-explosion layer has a tensile strength in a range from 10 MPa to 30 MPa; performing an alignment step to align the substrate and the anti-explosion layer with the display; and performing a bonding step to bond the substrate and the anti-explosion layer to the display to form the electronic device. In addition, the anti-explosion layer is disposed between the substrate and the display.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1A:
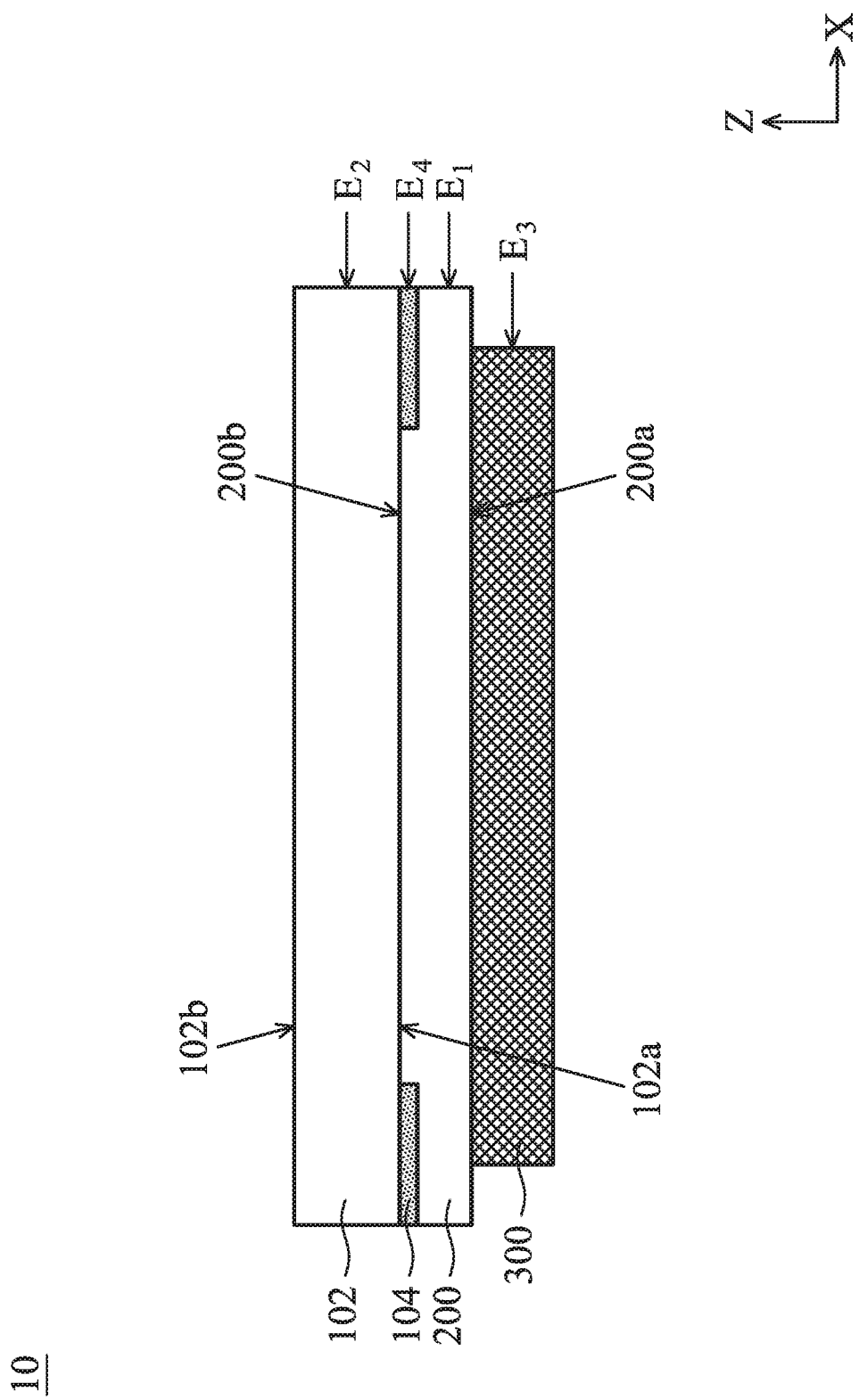
FIG. 1A is a cross-sectional diagram of the electronic device in accordance with some embodiments of the present disclosure.

The structure of the electronic device of the present disclosure and the manufacturing method thereof are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent that the exemplary embodiments set forth herein are used merely for the purpose of illustration. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be understood that the elements or devices in the drawings of the present disclosure may be present in any form or configuration known to those with ordinary skill in the art. In addition, in the embodiments, relative expressions are used. For example, "lower", "bottom", "higher" or "top" are used to describe the position of one element relative to another. It should be appreciated that if a device is flipped upside down, an element that is "lower" will become an element that is "higher". It should be understood that the descriptions of the exemplary embodiments are intended to be read in connection with the accompanying drawings, which are to be considered part of the entire written description. The drawings are not drawn to scale. In addition, structures and devices are shown schematically in order to simplify the drawing.

It should be understood that, although the terms first, second, third etc. may be used herein to describe various elements, components, or portions, these elements, components, or portions should not be limited by these terms. These terms are only used to distinguish one element, component, or portion from another element, component, or portion. Thus, a first element, component, or portion discussed below could be termed a second element, component, or portion without departing from the teachings of the present disclosure.

The terms "about" and "substantially" typically mean+/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially". Furthermore, the phrase "in a range between a first value and a second value" or "in a range from a first value to a second value" indicates that the range includes the first value, the second value, and other values between them.

In some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise. It will be understood that when an element or layer is referred to as being "disposed on" another element or layer, it can be directly disposed on the other element or layer, or intervening elements or layers may be present. In contrast, when an element is referred to as being "directly disposed on" another element or layer, there are no intervening elements or layers present.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In accordance with some embodiments of the present disclosure, an electronic device is provided. The electronic device includes an anti-explosion layer, having specific physical properties, disposed between a cover plate and a display. The risk of cracking and explosion of the cover plate due to impact may be thereby reduced. The safety of using electronic devices in a variety of environments, such as indoors, outdoors, or in the car may be improved.

Refer to FIG. 1A, which is a cross-sectional diagram of an electronic device 10 in accordance with some embodiments of the present disclosure. It should be understood that FIG. 1A only illustrates some components of the electronic device 10, and the detailed structure of some of the components will be further described in the following drawings. In accordance with some embodiments, additional features may be added to the electronic device 10 described below.

As shown in FIG. 1A, the electronic device 10 may include a substrate 102, an anti-explosion layer 200, and a display 300. The substrate 102 may be disposed on the display 300, and the anti-explosion layer 200 may be disposed between the substrate 102 and the display 300. In some embodiments, the substrate 102 may serve as a cover plate for the electronic device 10 to protect the display 300. Specifically, the substrate 102 may have a first surface 102a and a second surface 102b that is opposite to the first surface 102a, and the first surface 102a of the substrate 102 may be in contact with the anti-explosion layer 200. In some embodiments, the second surface 102b of the substrate 102 may be surface treated to have an auxiliary function. For example, in some embodiments, the second surface 102b may have an anti-glare film, an anti-reflection film, or an anti-smudge film etc. disposed thereon. In some embodiments, the above films may be formed by an electroplating process, a coating process, or other suitable processes.

In some embodiments, the material of the substrate 102 may include a glass material, but it is not limited thereto. In some embodiments, the glass material may include, but is not limited to, a glass material that has undergone chemical strengthening treatment and/or ion exchange treatment, for example, soda-lime glass, lead glass, borosilicate glass, quartz glass, aluminosilicate glass or other suitable glass materials, but they are not limited thereto.

Moreover, the anti-explosion layer 200 may have a first surface 200a and a second surface 200b that is opposite to the first surface 200a. The first surface 200a of the anti-explosion layer 200 may be in contact with the display 300, and the second surface 200b may be connected to the first surface 102a of the substrate 102. In some embodiments, the anti-explosion layer 200 may be used to adhere the substrate 102 to the display 300. In accordance with some embodiments, when the electronic device 10 is subjected to an external force to cause cracking of the substrate 102, the anti-explosion layer 200 may reduce the risk of explosion of the cracked substrate 102.

In some embodiments, the anti-explosion layer 200 may include an adhesive material. For example, in some embodiments, the anti-explosion layer 200 may include a heat-curing glue or a thermoplastic glue. Furthermore, the anti-explosion layer 200 may be formed of a material having specific physical properties. Specifically, in some embodiments, the anti-explosion layer 200 may have a tensile strength in a range from 10 MPa to 30 MPa (i.e. 10 Mpa≤the tensile strength≤30 MPa), or from 15 MPa to 25 MPa, for example, 16 MPa, 17 MPa, 18 MPa, 19 MPa, 20 MPa, 21 MPa, 22 MPa, 23 MPa, or 24 MPa.

In accordance with some embodiments, the tensile strength of the anti-explosion layer 200 may be measured by any suitable method known in the art, for example, according to a standard method of ASTM D638. In accordance with some embodiments, the cohesive force of the anti-explosion layer 200 or the force between the anti-explosion layer 200 and the substrate 102 (e.g., the cover plate) may reduce the risk of the substrate 102 cracking and being exploded by impact. It should be noted that if the tensile strength of the anti-explosion layer 200 is too low (for example, less than 10 MPa), the anti-explosion layer 200 may break more easily. When the substrate 102 breaks after the electronic device 10 is subjected to an external force, the ability of the anti-explosion layer 200 to prevent explosion of the broken substrate may be reduced.

In some embodiments, the anti-explosion layer 200 may have a peel adhesion in a range from 40 N/mm to 150 N/mm (i.e. 40 N/mm≤the peel strength≤150 N/mm), from 60 N/mm to 130 N/mm, or from 70 N/mm to 120 N/mm, for example, 80 N/mm, 90 N/mm, 100 N/mm, or 110 N/mm.

In accordance with some embodiments, the peel adhesion of the anti-explosion layer 200 may be measured by any suitable method known in the art, for example, according to a standard method of ASTM D3330. It should be noted that if the peel adhesion of the anti-explosion layer 200 is too low (for example, less than 40 N/mm), the anti-explosion layer 200 may not be effectively adhered or affixed to the substrate 102; on the other hand, if the peel adhesion of the anti-explosion layer 200 is too high (for example, greater than 150 N/mm) (i.e. the adhesion strength between the anti-explosion layer 200 and the substrate 102 is too great), the process may be more difficult to rework.

In some embodiments, the anti-explosion layer 200 may have a haze in a range from 0% to 1% (i.e. 0%≤the haze≤1%), or from 0.2% to 0.8%, for example, 0.3%, 0.4%, 0.5%, 0.6%, or 0.7%, the haze of the anti-explosion layer 200 may be measured by any suitable method, for example, according to a standard method of ASTM D1003. It should be noted that if the haze of the anti-explosion layer 200 is too high (for example, greater than 1%), the image quality of the display 300 may be affected. Moreover, in some embodiments, the anti-explosion layer 200 may have a light transmittance greater than 88%, for example, greater than 90%, 93%, 95%, or 98%, and the like.

In some embodiments, the first surface 200a of the anti-explosion layer 200 may have a roughness, and the roughness (Ry) may be in a range from 0 μm to 40 μm, the roughness of the anti-explosion layer 200 may be measured by any suitable method, for example, according to a standard method of DIN EN ISO 4287. In some embodiments, the roughness (Ry) of the first surface 200a may be in a range from 0 μm to 10 μm. In other words, in some embodiments, the first surface 200a of the anti-explosion layer 200 may be substantially smooth.

Figure 1B:
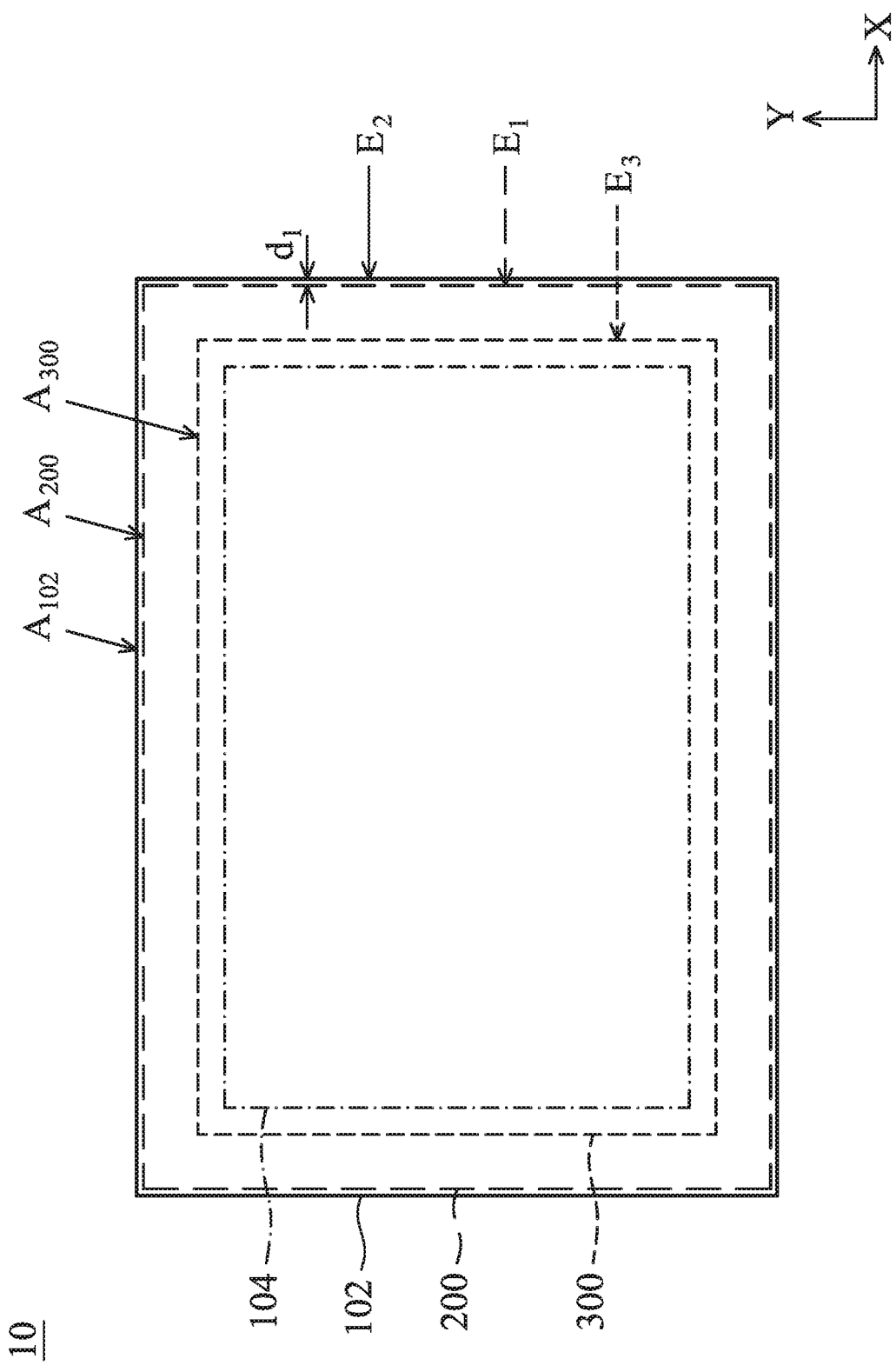
FIG. 1B is a top-view diagram of the electronic device in accordance with some embodiments of the present disclosure.

In addition, in some embodiments, the dimension of the anti-explosion layer 200 may be substantially equal to the size of the substrate 102. For example, the dimension may represent the area, length, width or thickness, unless otherwise specified, but it is not limited thereto. Specifically, refer to FIG. 1A and FIG. 1B, and FIG. 1B is a top-view diagram of the electronic device 10 corresponding to FIG. 1A in accordance with some embodiments of the present disclosure. In some embodiments, the area $A_{200}$ of the anti-explosion layer 200 may be substantially equal to the area $A_{102}$ of the substrate 102. In accordance with some embodiments, the area $A_{200}$ of the anti-explosion layer 200 may be, for example, the top area of the anti-explosion layer 200 that is away from the display 300. Similarly, the area $A_{102}$ of the substrate 102 may be, for example, the top area of the substrate 102 that is away from the display 300.

In some embodiments, a ratio of the area $A_{200}$ of the anti-explosion layer 200 to the area $A_{102}$ of the substrate 102 may be in a range from 99.5% to 100% (i.e. 99.5%≤($A_{200}$/$A_{102}$)×100%≤100%). It should be noted that, in some embodiments, if the ratio of the area $A_{200}$ of the anti-explosion layer 200 to the area $A_{102}$ of the substrate 102 is too low (for example, less than 99.5%) (i.e. the area $A_{200}$ of the anti-explosion layer 200 is too much smaller than the area $A_{102}$ of the substrate 102), when the substrate 102 is cracked, the number of pieces of the substrate 102 which are not fixed by the anti-explosion layer 200 may be increased, and thereby causing explosion of the cracked substrate 102.

In addition, referring to FIG. 1A and FIG. 1B, the anti-explosion layer 200 may have a first side $E_1$, and the substrate 102 may have a second side $E_2$. In some embodiments, the first side $E_1$ of the anti-explosion layer 200 and the second side $E_2$ of the substrate 102 are located on the same side of the electronic device 10. In some embodiments, the first side $E_1$ of the anti-explosion layer 200 may be substantially aligned with the second side $E_2$ of the substrate 102, but it is not limited thereto.

In some embodiments, the first side $E_1$ of the anti-explosion layer 200 may be spaced apart from the second side $E_2$ of the substrate 102 by a distance $d_1$. In some embodiments, the distance $d_1$ may be in a range from 0 mm to 0.3 mm (i.e. 0 mm≤$d_1$≤0.3 mm). It should be noted that, in some embodiments, if the distance $d_1$ between the first side $E_1$ and the second side $E_2$ is too long (for example, greater than 0.3 mm) (i.e. the difference between the area $A_{200}$ of the anti-explosion layer 200 and the area $A_{102}$ of the substrate 102 is too great), when the substrate 102 cracks, the anti-explosion layer 200 may not grasp the pieces of the substrate 102, and thereby causing explosion of the cracked substrate 102.

It should be understood that although the shape of the substrate 102 and the anti-explosion layer 200 are rectangular in the drawings, in accordance with some other embodiments, the substrate 102 and the anti-explosion layer 200 may have any other suitable shape according to actual needs, for example, a circle, an ellipse, a triangle, a pentagon, a diamond, or an irregular shape.

As described above, the anti-explosion layer 200 may fix the substrate 102 to the display 300, and the display 300 may be in contact with the first surface 200a of the anti-explosion layer 200. In accordance with some embodiments, the display 300 may include, for example, a liquid crystal (LC), an organic light-emitting diode (OLED), a quantum dot (QD), a quantum dot light-emitting diode (QLED, QD-LED), a fluorescent material, a phosphor material, a light-emitting diode (LED), a micro light-emitting diode, a mini light-emitting diode, another suitable material, or a combination thereof, but the present disclosure is not limited thereto.

In addition, in some embodiments, the display 300 may include, for example, a flexible display, a touch display, a tiled display, or a curved display, but it is not limited thereto.

Figure 3:
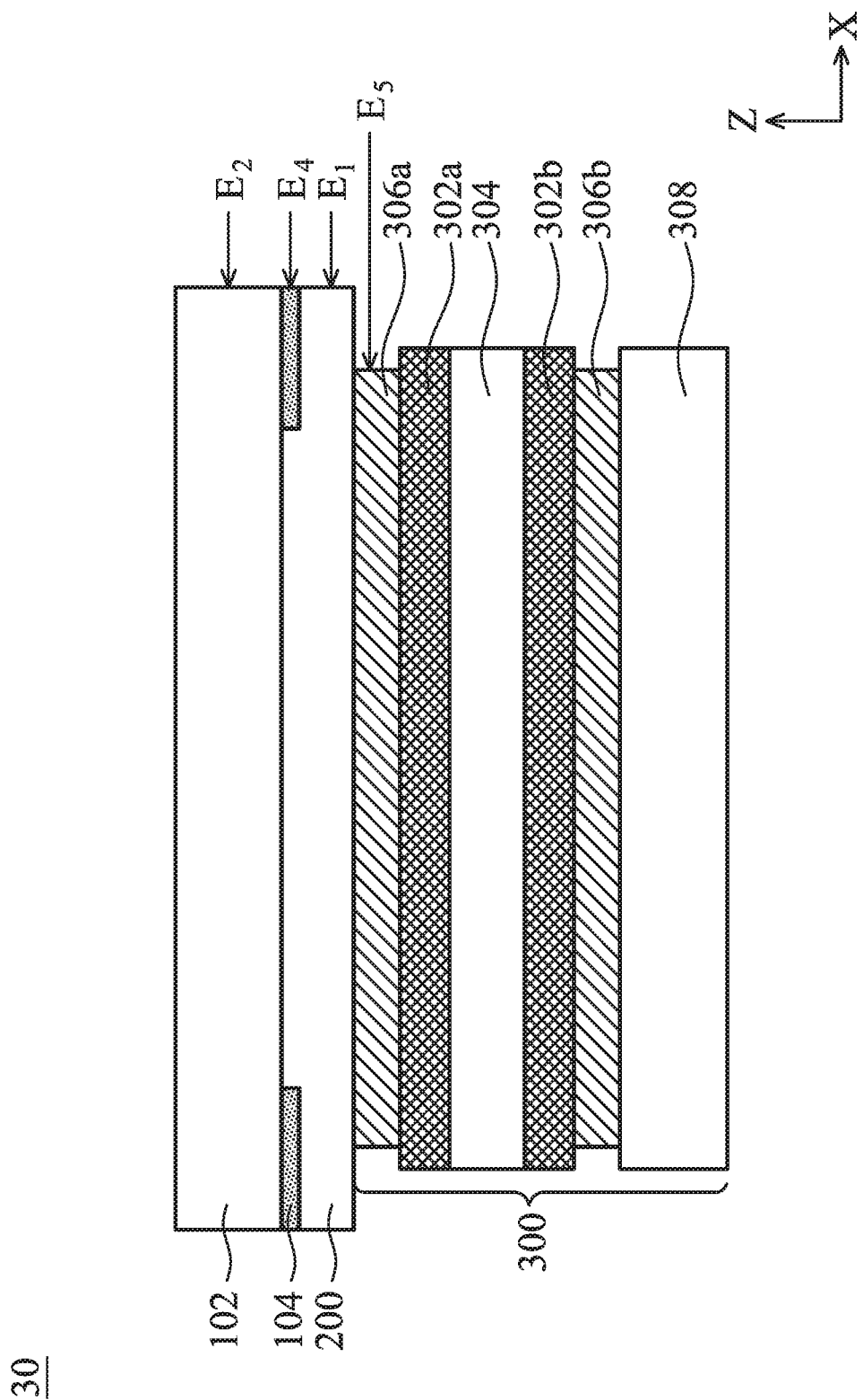
FIG. 3 is a cross-sectional diagram of the electronic device in accordance with some embodiments of the present disclosure.
Figure 4:
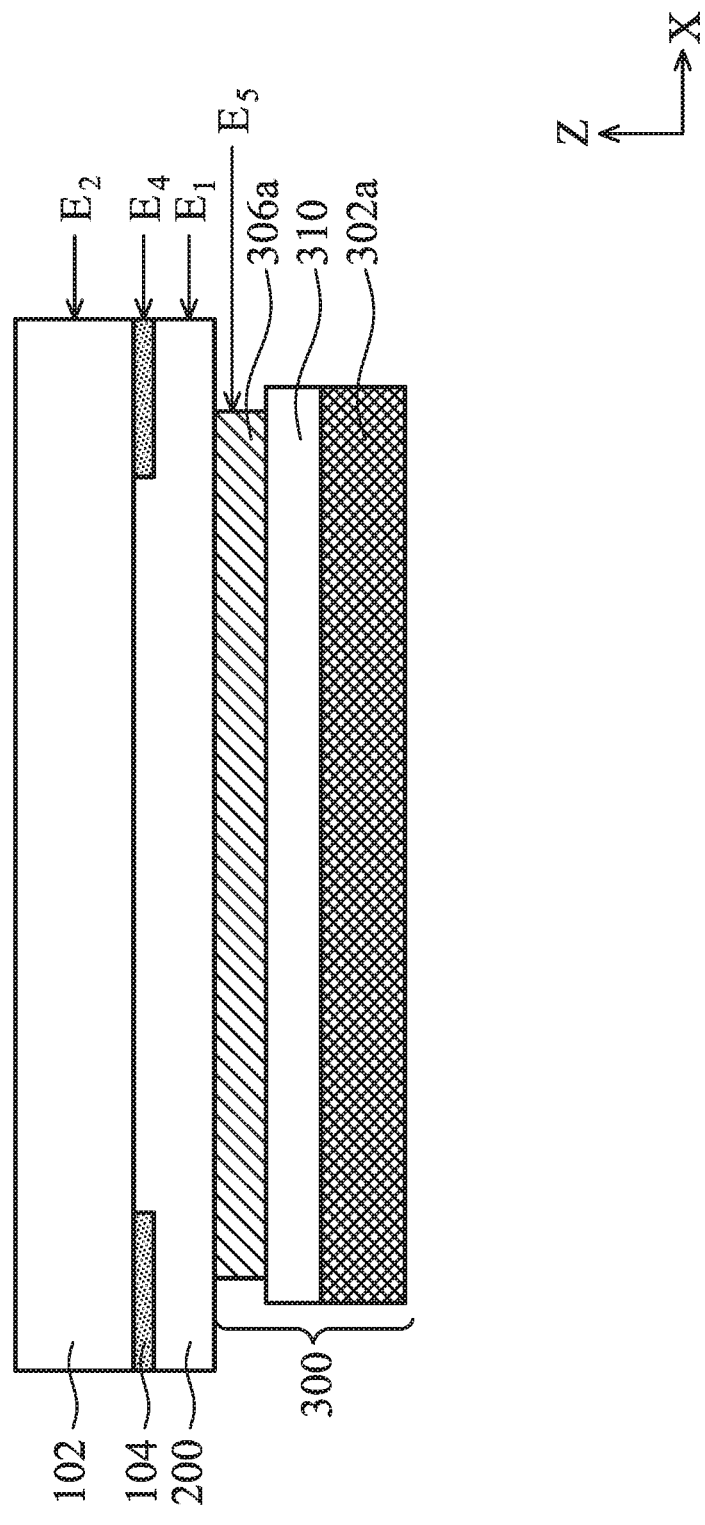
FIG. 4 is a cross-sectional diagram of the electronic device in accordance with some embodiments of the present disclosure.

Referring to FIG. 1A and FIG. 1B, in some embodiments, the area $A_{200}$ of the anti-explosion layer 200 may be greater than the area $A_{300}$ of the display 300. In accordance with some embodiments, the area $A_{300}$ of the display 300 may be, for example, the top area of the display 300 that is away from the substrate 102. In addition, in some embodiments, the area $A_{300}$ of the display 300 may be considered as the area of an element of the display 300 that is closest to the anti-explosion layer 200, for example, the area of the first polarizing plate 306a (as shown in FIG. 3 or FIG. 4), but the present disclosure is not limited thereto.

In some embodiments, the area $A_{200}$ of the anti-explosion layer 200 may be greater than the area $A_{300}$ of the display 300. In addition, the display 300 may have a third side $E_3$. In some embodiments, the third side $E_3$ of the display 300 and the first side $E_1$ of the anti-explosion layer 200 may be located on the same side of electronic device 10. In some embodiments, the third side $E_3$ of the display 300 may shrink inward compared to the first side $E_1$ of the anti-explosion layer 200.

Furthermore, as shown in FIG. 1A, in some embodiments, the electronic device 10 may further include a shielding layer 104 disposed between the anti-explosion layer 200 and the substrate 102. In some embodiments, the shielding layer 104 may surround the substrate 102 and at least partially overlap the non-display area of the display 300 in the normal direction (e.g., the Z direction) of the substrate 102. The shielding layer 104 may reduce light leakage of the display 300 in the non-display area and/or shield the wiring area at the edge of the display 300, thereby improving the image quality. In some embodiments, the shielding layer 104 may be in contact with the first surface 102a of the substrate 102.

In addition, the shielding layer 104 may have a fourth side $E_4$. In some embodiments, the fourth side $E_4$ of the shielding layer 104, the first side $E_1$ of the anti-explosion layer 200 and the second side $E_2$ of the substrate 102 may be located on the same side of electronic device 10. In some embodiments, the fourth side $E_4$ of the shielding layer 104 may be substantially aligned with the first side $E_1$ of the anti-explosion layer 200 and/or the second side $E_2$ of the substrate 102, but it is not limited thereto.

In some embodiments, the shielding layer 104 may include an insulating material. In some embodiments, the shielding layer 104 may include a material having a light shielding property. For example, the shielding layer 104 may be formed of a material having a low reflectivity (e.g., less than 30%). In some embodiments, the material of the shielding layer 104 may include, but is not limited to, a black photoresist. In some embodiments, the shielding layer 104 may include, but is not limited to, an ink, an organic resin, an organic pigment, an inorganic pigment, another suitable material, or a combination thereof.

Figure 2:
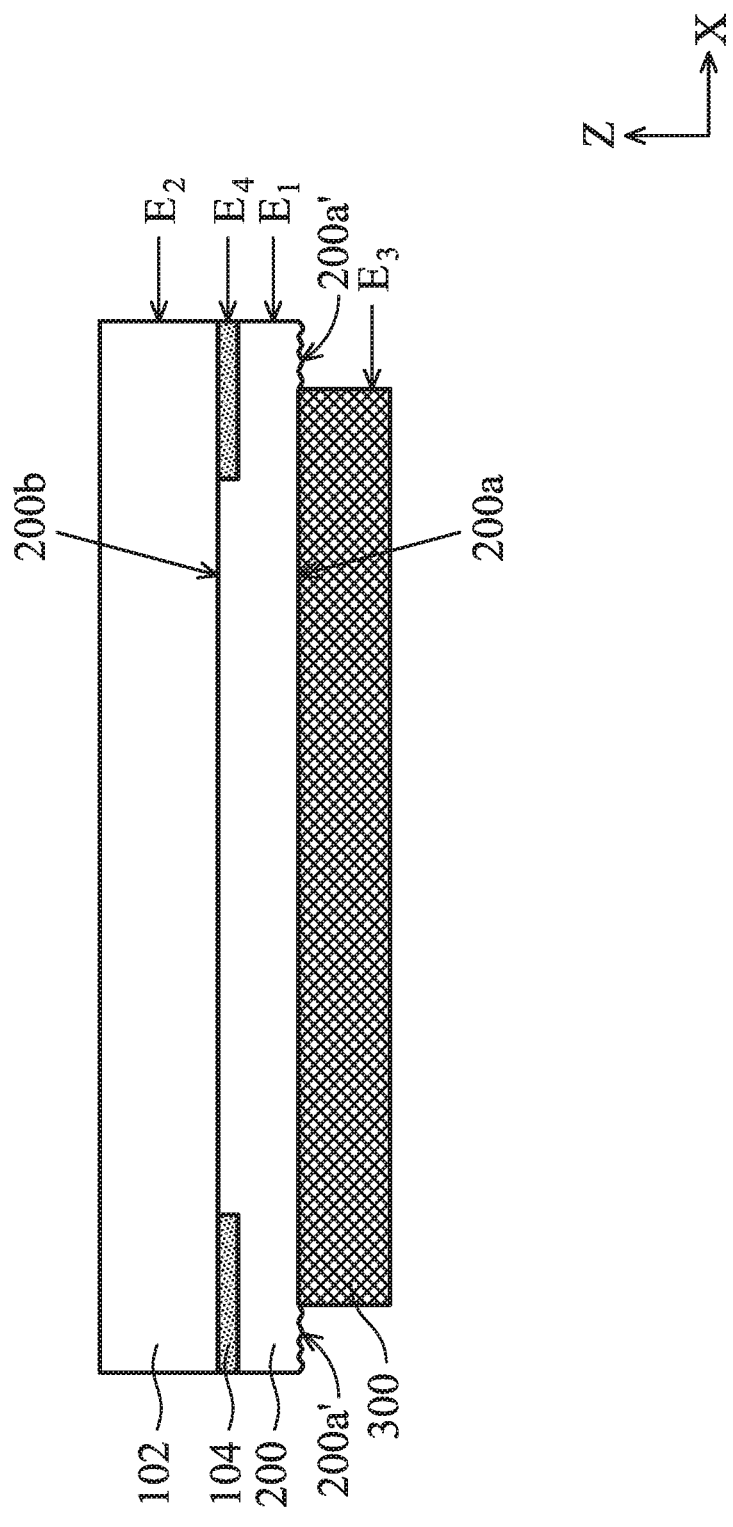
FIG. 2 is a cross-sectional diagram of the electronic device in accordance with some embodiments of the present disclosure.

Next, refer to FIG. 2, which is a cross-sectional diagram of the electronic device 20 in accordance with some other embodiments of the present disclosure. It should be understood that the same or similar components or elements in above and below contexts are represented by the same or similar reference numerals. The materials, manufacturing methods and functions of these components or elements are the same or similar to those described above, and thus will not be repeated herein.

The embodiment shown in FIG. 2 is substantially similar to the embodiment shown in FIG. 1A. The difference between them is that the anti-explosion layer 200 may have a rough surface in this embodiment. As described above, the anti-explosion layer 200 has the first surface 200a that is adjacent to the display 300. In this embodiment, the roughness (Ry) of a portion of the surface 200a' of the first surface 200a may be in a range from 10 μm to 40 μm, or from 20 μm to 30 μm. In other words, the roughness (Ry) of the portion of the surface 200a' of the anti-explosion layer 200 that is not in contact with the display 300 may be in a range from 10 μm to 40 μm, or from 20 μm to 30 μm.

Next, refer to FIG. 3, which is a cross-sectional diagram of the electronic device 30 in accordance with some other embodiments of the present disclosure. In accordance with some embodiments, the display 300 may include a liquid-crystal display. The liquid-crystal display may include, for example, a twisted nematic (TN) liquid-crystal display, a super twisted nematic (STN) liquid-crystal display, a double layer super twisted nematic (DSTN) liquid-crystal display, a vertical alignment (VA) liquid-crystal display, an in-plane switching (IPS) liquid-crystal display, a cholesteric liquid-crystal display, a blue phase liquid-crystal display, a fringe field switching (FFS) liquid-crystal display, another suitable liquid crystal-display, or a combination thereof, but it is not limited thereto.

It should be understood that the display 300 illustrated in the drawings is an exemplary structure, and some of the elements are omitted. In accordance with some embodiments, additional features may be added to the display 300 described below, and those of ordinary skill in the art may adjust the configuration of the display 300 according to need. As shown in FIG. 3, in some embodiments, the display 300 may include a first substrate 302a, a second substrate 302b, and a liquid-crystal layer 304 disposed between the first substrate 302a and the second substrate 302b.

In some embodiments, the materials of the first substrate 302a and the second substrate 302b may include, but are not limited to, glass, quartz, sapphire, polycarbonate (PC), polyimide (PI), polyethylene terephthalate (PET), liquid-crystal polymer (LCP), rubber, glass fiber, ceramic, another suitable substrate material, or a combination thereof.

In some embodiments, the liquid-crystal layer 304 may include liquid-crystal molecules (not illustrated). In some embodiments, the displayed image may be adjusted by applying different electric fields to the liquid-crystal layer 304 to change the dielectric constant of the liquid-crystal molecules. However, in accordance with some other embodiments, the liquid-crystal layer 304 may be replaced with a modulating material that can have different properties (e.g., a dielectric coefficient) by particular adjustments (e.g., by applying an electric field or other means).

Furthermore, the display 300 may further include a first polarizing plate 306a and a second polarizing plate 306b respectively disposed on the first substrate 302a and the second substrate 302b, and a backlight module 308 disposed adjacent to the second polarizing plate 306b. The first polarizing plate 306a and the liquid-crystal layer 304 may be located on opposite sides of the first substrate 302a, and the second polarizing plate 306b and the liquid-crystal layer 304 may be located on opposite sides of the second substrate 302b.

In some embodiments, the materials of the first polarizing plate 306a and the second polarizing plate 306b may include polyvinyl alcohol (PVA), or other suitable materials, but they are not limited thereto. For example, in some embodiments, the first polarizing plate 306a and the second polarizing plate 306b each may include two protective layers and a polyvinyl alcohol film interposed between the two protective layers. The protective layer may include, for example, triacetyl cellulose (TAC) membrane. However, in some other embodiments, the first polarizing plate 306a and/or the second polarizing plate 306b may be replaced by a wire grid polarizer (WGP).

In some embodiments, the backlight module 308 may include, but is not limited to, an inorganic light-emitting diode, an organic light-emitting diode, an electroluminescent element, another suitable light-emitting element, or a combination thereof. In some embodiments, the material of the light-emitting element of the backlight module 308 may include, but is not limited to, a quantum dot (QD) material, a fluorescent material, a phosphor material, another suitable material, or a combination thereof. In some embodiments, the backlight module 308 may further include a prism, a brightness enhancement film (BEF), a light guide plate, a diffusion plate, a reflective sheet, a QD film, another suitable element, or a combination thereof, but it is not limited thereto.

In addition, as shown in FIG. 3, in some embodiments, the first polarizing plate 306a of the display 300 may be in contact with the anti-explosion layer 200. That is, the anti-explosion layer 200 may be directly attached to the first polarizing plate 306a. As described above, in some embodiments, the area $A_{200}$ of the anti-explosion layer 200 may be greater than the area $A_{300}$ of the display 300. Specifically, in some embodiments, in the top-view perspective (the X-Y plane) of the electronic device 30, the area $A_{200}$ of the anti-explosion layer 200 (for example, as shown in FIG. 1B) may be greater than the top area of the first polarizing plate 306a (not illustrated).

Furthermore, the first polarizing plate 306a may have a fifth side $E_5$. In some embodiments, the fifth side $E_5$ of the first polarizing plate 306a and the first side $E_1$ of the anti-explosion layer 200 may be located on the same side of the electronic device 30. In some embodiments, the fifth side $E_5$ of the first polarizing plate 306a may shrink inward compared to the first side $E_1$ of the anti-explosion layer 200. Moreover, in accordance with some embodiments, the area $A_{200}$ of the anti-explosion layer 200 may also be greater than the top area (not illustrated) of the first substrate 302a, the liquid-crystal layer 304, the second substrate 302b, or the second polarizing plate 306b of the display 300.

In some embodiments, the display 300 may further include a driving circuit, an electrode layer, an alignment layer or a light conversion layer etc. disposed on the first substrate 302a and/or the second substrate 302b although they are not illustrated in the drawings. These elements described above may be present in any form or configuration known to those with ordinary skill in the art.

Specifically, the driving circuit may be, for example, an active driving circuit or a passive driving circuit. In accordance with some embodiments, the driving circuit may include, but is not limited to, a transistor (e.g., a switching transistor or a driving transistor, etc.), a data line, a scan line, a conductive pad, a dielectric layer and so on. The switch transistor may be used to control the switching of the pixels of display 300. In some embodiments, the transistor may include, but is not limited to, low-temperature polysilicon (LTPS), indium gallium zinc oxide (IGZO), amorphous silicon (a-Si), or a combination thereof. In some embodiments, the driving circuit may control the pixels by an external integrated circuit (IC) or a microchip or the like.

The electrode layer may be electrically connected to the driving circuit to control the electric field that is applied to the liquid-crystal layer 304. In some embodiments, the electrode layer may include a metallic conductive material. In some embodiments, the material of the electrode layer may include, but is not limited to, copper, silver, tin, aluminum, molybdenum, tungsten, gold, chromium, nickel, platinum, copper alloy, silver alloy, tin alloy, aluminum alloy, molybdenum alloy, tungsten alloy, gold alloy, chromium alloy, nickel alloy, platinum alloy, another suitable conductive material, or a combination thereof.

The alignment layer may be disposed between the electrode layer and the liquid-crystal layer 304. The alignment layer may control the alignment direction of the liquid-crystal molecules in the liquid-crystal layer 304. In some embodiments, the material of the alignment layer may include, but is not limited to, polyimide (PI) or other materials having an alignment function.

Furthermore, the light conversion layer may be disposed between the first substrate 302a and the liquid-crystal layer 304 or between the second substrate 302b and the liquid-crystal layer 304. The light conversion layer may have a function of converting the wavelength of light, for example, the generated light source may be converted into light having a specific wavelength range (a specific color). In some embodiments, the light converting layer may include a matrix and particles dispersed in the matrix. In some embodiments, the material of the matrix may include, but is not limited to, an organic polymer, an inorganic polymer, glass, or a combination thereof. In some embodiments, the substrate may be transparent or semi-transparent. In some embodiments, the particles may include, but is not limited to, a phosphor, a quantum dot (QD) material, an organic fluorescent material, another suitable material, or a combination thereof.

Next, refer to FIG. 4, which is a cross-sectional diagram of the electronic device 40 in accordance with some other embodiments of the present disclosure. In accordance with some embodiments, the display 300 may include an inorganic light-emitting diode display or an organic light-emitting diode display. As shown in FIG. 4, in some embodiments, the display 300 may include the first substrate 302a, a light-emitting layer 310 disposed on the first substrate 302a, and the first polarizing plate 306a disposed on the light-emitting layer 310. The first polarizing plate 306a may be disposed between the light-emitting layer 310 and the anti-explosion layer 200.

The first substrate 302a and the first polarizing plate 306a are as described above, and thus will not be repeated here. In this embodiment, the light-emitting layer 310 may include an inorganic light-emitting diode, an organic light-emitting diode, another suitable light-emitting element, or a combination thereof, but it is not limited thereto. The inorganic light-emitting diode may include, for example, a sub-millimeter light-emitting diode (mini LED), a micro light-emitting diode (micro LED), a light-emitting diode (LED), a quantum dot (quantum dot, QD), a quantum dot light-emitting diode (QLED, QD-LED) or a combination thereof. Moreover, the light-emitting diode may be a light-emitting diode having a vertical type structure or a flip-chip type structure.

In addition, as shown in FIG. 4, in this embodiment, the first polarizing plate 306a of the display 300 may be in contact with the anti-explosion layer 200. That is, the anti-explosion layer 200 may be directly attached to the first polarizing plate 306a. As described above, in some embodiments, in the top-view perspective (the X-Y plane) of the electronic device 40, the area $A_{200}$ of the elements of the anti-explosion layer 200 (e.g., as shown in FIG. 1B) may be greater than the top area (not illustrated) of the first polarizing plate 306a. Furthermore, in this embodiment, the fifth side $E_5$ of the first polarizing plate 306a may shrink inward compared to the first side $E_1$ of the anti-explosion layer 200. Moreover, in accordance with some embodiments, the size of the anti-explosion layer 200 may also be larger than the size of the first substrate 302a or the light-emitting layer 310 of the display 300.

Figure 5:
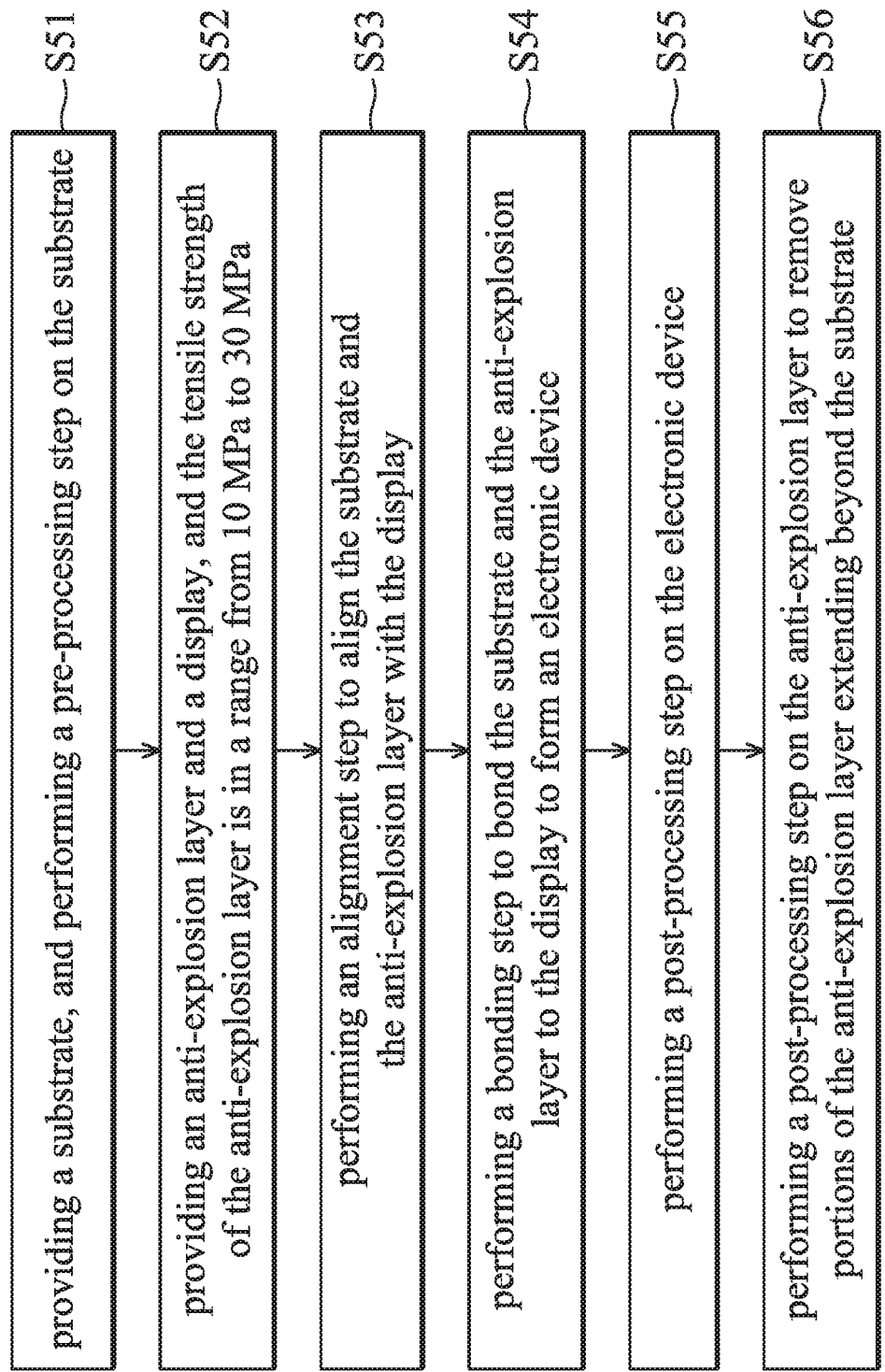
FIG. 5 is a process flow diagram of the method for manufacturing the electronic device in accordance with some embodiments of the present disclosure.

Next, refer to FIG. 5, which is a process flow diagram of a manufacturing method 50A of the electronic device in accordance with some embodiments of the present disclosure. It should be understood that additional operations may be provided before, during, and/or after the manufacturing method 50A of electronic device. In accordance with some embodiments, some of the stages described below may be replaced or deleted. In some embodiments, the electronic device 20 as shown in FIG. 2 may be formed by the manufacturing method 50A of the electronic device.

As shown in FIG. 5, in some embodiments, the manufacturing method 50A of the electronic device may include the following steps: providing the substrate 102, and performing a pre-processing step on the substrate 102 (step S51); providing the anti-explosion layer 200 and the display 300, and the tensile strength of the anti-explosion layer 200 may be in a range from about 10 MPa to about 30 MPa (step S52); performing an alignment step to align the substrate 102 and the anti-explosion layer 200 with the display 300 (step S53); and performing a bonding step to bond the substrate 102 and the anti-explosion layer 200 to the display 300 to form the electronic device 20 (step S54).

In some embodiments, the pre-processing step (step S51) performed on the substrate 102 may include a laser cleaning process, an ultraviolet cleaning process, coating of a material modification layer, a detergent cleaning process, a plasma cleaning process, another suitable process, or a combination thereof, but it is not limited thereto. In some embodiments, the same or similar pre-processing steps may be performed on the substrate (for example, the first substrate 302a shown in FIG. 3 or FIG. 4) to be bonded to the anti-explosion layer 200 in the display 300 to increase the surface energy of the substrate 102.

As described above, in some embodiments, the anti-explosion layer 200 may include, but is not limited to, a heat-curing glue or a thermoplastic glue. In some embodiments, the anti-explosion layer 200 may be solid (nonadhesive) before the bonding step; and therefore, in the alignment step (step S53), the solid anti-explosion layer 200 may be first placed between the substrate 102 and the display 300, and then the substrate 102 and the anti-explosion layer 200 may be aligned with the display 300 by a jig, for example, by a side edge alignment. Moreover, in accordance with some embodiments, the area $A_{200}$ of the anti-explosion layer 200 that has not been bonded may be larger than the area $A_{102}$ of the substrate 102.

In some embodiments, the substrate 102 may be attached to the display 300 by the anti-explosion layer 200. Specifically, the bonding step may include performing a heating and/or a pressurization step on the substrate 102, the anti-explosion layer 200, and the display 300 in a vacuum environment to render the anti-explosion layer 200 gel-like and adhesive. In some embodiments, in the bonding step (step S54), the degree of vacuum may be in a range from 0 Pa to 100 Pa, the temperature may be in a range from 60° C. to 120° C., and the pressure may be in a range from 0.5 kgf/cm$^2$ to 5 kgf/cm$^2$.

In some embodiments, the degree of vacuum of the bonding step may be in a range from 0 Pa to 60 Pa, for example, 10 Pa, 20 Pa, 30 Pa, 40 Pa, or 50 Pa. In some embodiments, the temperature of the bonding step may be in a range from 80° C. to 100° C., for example, 85° C., 90° C., or 95° C. In some embodiments, the pressure of the bonding step may be in a range from 1 kgf/cm$^2$ to 4 kgf/cm$^2$, for example, 1.5 kgf/cm$^2$, 2 kgf/cm$^2$, 2.5 kgf/cm$^2$, 3 kgf/cm$^2$, or 3.5 kgf/cm$^2$.

Furthermore, in some embodiments, the manufacturing method 50A of the electronic device may further include performing a post-processing step on the electronic device 20 after the bonding process (step S55). The post-processing step may remove bubbles that are generated in the bonding step (for example, bubbles between the anti-explosion layer 200 and the substrate 102 or the display 300, or bubbles in the anti-explosion layer 200) to make the bonding more compact. In some embodiments, the post-processing step of electronic device 20 may include a heating step and/or a pressurization step. In some embodiments, the temperature of the heating step may be in a range from 70° C. to 150° C., and the pressure of the pressurization step may be in a range from 7 kgf/cm$^2$ to 15 kgf/cm$^2$. In some embodiments, the post-processing step may take from 20 minutes to 120 minutes.

In some embodiments, the temperature of the post-processing step may be in a range from 90° C. to 140° C., for example, 100° C., 110° C., 120° C., or 130° C. In some embodiments, the pressure of the post-processing step may be in a range from 10 kgf/cm$^2$ to 14 kgf/cm$^2$, for example, 11 kgf/cm$^2$, 12 kgf/cm$^2$, or 13 kgf/cm$^2$. In some embodiments, the post-processing step may take from 40 minutes to 80 minutes, for example, 50 minutes, 60 minutes, or 70 minutes.

Furthermore, in some embodiments, the manufacturing method 50A of the electronic device may further include performing a post-processing step on the anti-explosion layer 200 to remove portions of the anti-explosion layer 200 extending beyond the substrate 102 (step S56). Specifically, the post-processing step of the anti-explosion layer 200 may include removing a portion of the anti-explosion layer 200 that extend beyond the substrate 102 in a normal direction (for example, the Z direction) of the substrate 102 so that the area $A_{200}$ of the anti-explosion layer 200 can be substantially equal to area $A_{102}$ of substrate 102. In some embodiments, after the post-processing step of the anti-explosion layer 200 is performed, the second side $E_2$ of the substrate 102 may be substantially aligned with the first side $E_1$ of the anti-explosion layer 200 (as shown in FIG. 2).

In some embodiments, the anti-explosion layer 200 that extends beyond the substrate 102 in the normal direction of the substrate 102 may be removed by a cutting process, a polishing process, another suitable process, or a combination thereof.

In addition, in some embodiments, the manufacturing method 50A of the electronic device may further include a step of forming the shielding layer 104 between the anti-explosion layer 200 and the substrate 102 (not illustrated). In some embodiments, the shielding layer 104 may be formed on the first surface 102a of the substrate 102 before the alignment step S53, and then the alignment step S53 is performed.

In some embodiments, the shielding layer 104 may be formed by a chemical vapor deposition process, a coating process, a printing process, another suitable process, or a combination thereof. Furthermore, the shielding layer 104 may be formed by one or more photolithography processes and etching processes.

Figure 6:
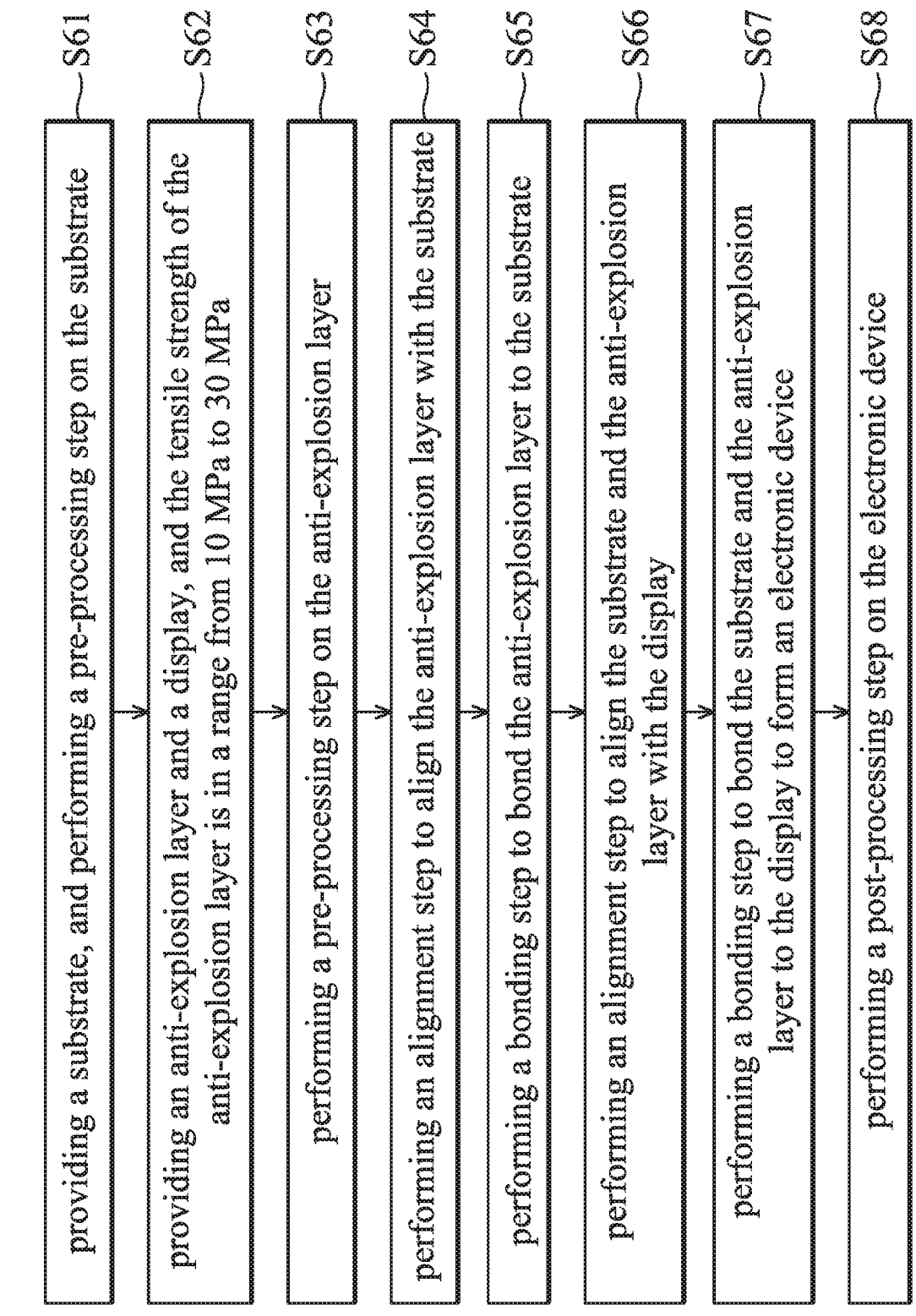
FIG. 6 is a process flow diagram of the method for manufacturing the electronic device in accordance with some embodiments of the present disclosure.

Next, refer to FIG. 6, which is a process flow diagram of a manufacturing method 60A of the electronic device in accordance with some other embodiments of the present disclosure. It should be understood that additional operations may be provided before, during, and/or after the manufacturing method 60A of electronic device. In accordance with some embodiments, some of the stages described below may be replaced or deleted. In some embodiments, the electronic device 10 as shown in FIG. 1A may be formed by the manufacturing method 60A of the electronic device.

As shown in FIG. 6, in some embodiments, the manufacturing method 60A of the electronic device may include the following steps: providing the substrate 102, and performing a pre-processing step on the substrate 102 (step S61); providing the anti-explosion layer 200 and the display 300, and the tensile strength of the anti-explosion layer 200 may be in a range from about 10 MPa to about 30 MPa (step S62); performing a pre-processing step on the anti-explosion layer 200 (step S63); performing an alignment step to align the anti-explosion layer 200 with the substrate 102 (step S64); performing a bonding step to bond the anti-explosion layer 200 to the substrate 102 (step S65); performing an alignment step to align the substrate 102 and the anti-explosion layer 200 with the display 300 (step S66); performing a bonding step to bond the substrate 102 and the anti-explosion layer 200 to the display 300 to form the electronic device 10 (step S67); and performing a post-processing step on the electronic device 10 (step S68).

The manufacturing method 60A of the electronic device is substantially similar to the manufacturing method 50A of the electronic device. The main difference is that the manufacturing method 60A of the electronic device may further include a step of pre-processing the anti-explosion layer 200 (step S63) and include two-stage alignment steps and two-stage bonding steps (steps S64 to S67). Steps S61, S62 and S68 are similar to steps S51, S52 and S56, respectively, in the method 50A, and thus a description of them will not be repeated here.

In some embodiments, the pre-processing step of the anti-explosion layer 200 (step S63) may include a heating step and/or a pressurization step on the anti-explosion layer 200 in a vacuum environment. In some embodiments, the characteristics of the anti-explosion layer 200 may be adjusted as desired, for example, the haze may be reduced. Moreover, it should be understood that, in accordance with some embodiments, the order of the pre-processing step of substrate 102 (step S61) and the pre-processing step of the anti-explosion layer 200 (step S63) may be interchangeable. In some embodiments, the degree of vacuum of the pre-processing step (step S63) may be in a range from 0 Pa to 100 Pa, the temperature of the heating step may be in a range from 60° C. to 120° C., and the pressure of the pressurization step may be in a range from 0.5 kgf/cm$^2$ to 5 kgf/cm$^2$.

In some embodiments, the degree of vacuum of the pre-processing step may be in a range from 0 Pa to 60 Pa, for example, 10 Pa, 20 Pa, 30 Pa, 40 Pa, or 50 Pa. In some embodiments, the temperature of the heating step may be in a range from 80° C. to 100° C., for example, 85° C., 90° C., or 95° C. In some embodiments, the pressure of the pressurization step may be in a range from 1 kgf/cm$^2$ to 4 kgf/cm$^2$, for example, 1.5 kgf/cm$^2$, 2 kgf/cm$^2$, 2.5 kgf/cm$^2$, 3 kgf/cm$^2$, or 3.5 kgf/cm$^2$.

In some embodiments, the pre-processing step may soften the anti-explosion layer 200, reduce the surface roughness of the anti-explosion layer 200, and/or planarize the surface of the anti-explosion layer 200. In some embodiments, a chemical bond or a physical bond may be formed between the anti-explosion layer 200 that has been treated by the pre-processing step and the substrate 102 to enhance the adhesion force. In some embodiments, the surface roughness (Ry) of the anti-explosion layer 200 that has been treated by the pre-processing step may be in a range from 0 μm to 10 μm (e.g., the first surface 200a as shown in FIG. 1A).

As described above, in this embodiment, the anti-explosion layer 200 and the substrate 102 may be aligned and bonded together (step S64 and step S65). Specifically, a charge coupled device (CCD) may be used to align the anti-explosion layer 200 that has been treated by the pre-processing step with the substrate 102 to improve the alignment accuracy of the anti-explosion layer 200 and the substrate 102, and then the anti-explosion layer 200 may be attached to the substrate 102.

In some embodiments, the step of bonding the anti-explosion layer 200 to the substrate 102 (step S65) may include performing a heating step and/or a pressurization step on the anti-explosion layer 200 in a vacuum environment. In some embodiments, the degree of vacuum of the bonding step (step S65) may be in a range from 0 Pa to 100 Pa, the temperature of the heating step may be in a range from 60° C. to 120° C., and the pressure of the pressurization step may be in a range from 0.5 kgf/cm$^2$ to 5 kgf/cm$^2$.

In some embodiments, the degree of vacuum of the bonding step of the anti-explosion layer 200 to the substrate 102 may be in a range from 0 Pa to 60 Pa, for example, 10 Pa, 20 Pa, 30 Pa, 40 Pa, or 50 Pa. In some embodiments, the temperature of the bonding step may be in a range from 80° C. to 100° C., for example, 85° C., 90° C., or 95° C. In some embodiments, the pressure of the bonding step may be in a range from 1 kgf/cm$^2$ to 4 kgf/cm$^2$, for example, 1.5 kgf/cm$^2$, 2 kgf/cm$^2$, 2.5 kgf/cm$^2$, 3 kgf/cm$^2$, or 3.5 kgf/cm$^2$.

After step S64 and step S65, the substrate 102 that has been bonded to the anti-explosion layer 200 may be further bonded to the display 300 and aligned with the display 300 (step S66 and step S67). Specifically, a charge coupled device (CCD) may be used to align the substrate 102 with the display 300 and the substrate 102 may be bonded to the display 300 by the anti-explosion layer 200. In some embodiments, in step S66, the substrate 102 may be aligned with the first polarizing plate 306a or the first substrate 302a of the display 300 (e.g., as shown in FIG. 3 or FIG. 4).

In some embodiments, the bonding step (step S66) may include performing a heating step and/or a pressurization step on the substrate 102, the anti-explosion layer 200 and the display 300 in a vacuum environment to render the anti-explosion layer 200 gel-like and adhesive. It is viscous and sticky. In some embodiments, in the bonding step (step S67), the degree of vacuum may be in a range from 0 Pa to 100 Pa, the temperature may be in a range from 60° C. to 120° C., and the pressure may be in a range from 0.5 kgf/cm$^2$ to 5 kgf/cm$^2$.

In some embodiments, the degree of vacuum of the bonding step may be in a range from 0 Pa to 60 Pa, for example, 10 Pa, 20 Pa, 30 Pa, 40 Pa, or 50 Pa. In some embodiments, the temperature of the bonding step may be in a range from 80° C. to 100° C., for example, 85° C., 90° C., or 95° C. In some embodiments, the pressure of the bonding step may be in a range from 1 kgf/cm$^2$ to 4 kgf/cm$^2$, for example, 1.5 kgf/cm$^2$, 2 kgf/cm$^2$, 2.5 kgf/cm$^2$, 3 kgf/cm$^2$, or 3.5 kgf/cm$^2$.

Figure 7:
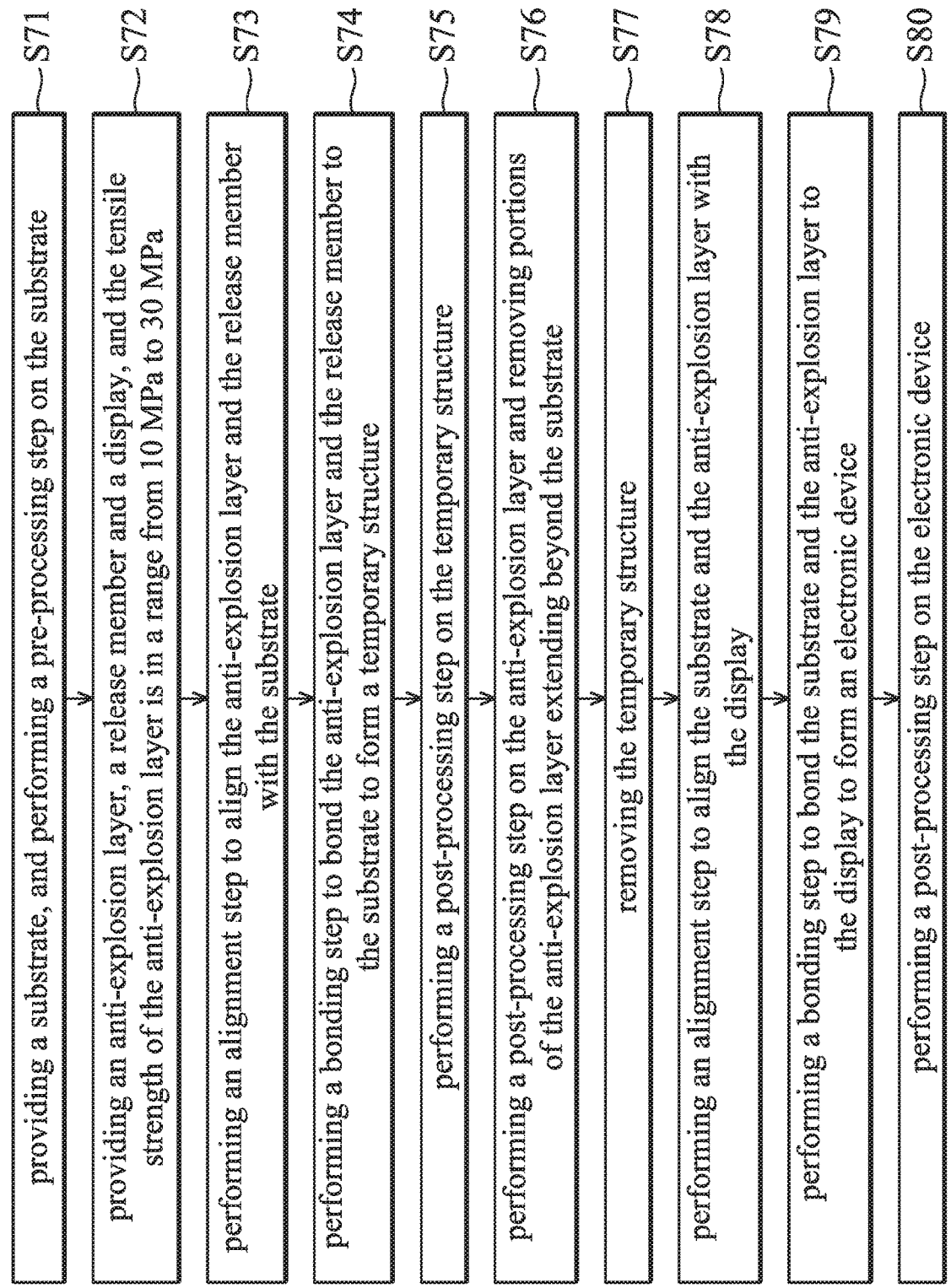
FIG. 7 is a process flow diagram of the method for manufacturing the electronic device in accordance with some embodiments of the present disclosure.

Next, refer to FIG. 7, which is a process flow diagram of a manufacturing method 70A of the electronic device in accordance with some other embodiments of the present disclosure. It should be understood that additional operations may be provided before, during, and/or after the manufacturing method 70A of electronic device. In accordance with some embodiments, some of the stages described below may be replaced or deleted. In some embodiments, the electronic device 20 as shown in FIG. 2 may be formed by the manufacturing method 70A of the electronic device.

As shown in FIG. 7, in some embodiments, the manufacturing method 70A of the electronic device may include the following steps: providing the substrate 102, and performing a pre-processing step on the substrate 102 (step S71); providing the anti-explosion layer 200, a release member (not illustrated) and a display 300, and the tensile strength of the anti-explosion layer 200 may be in a range from 10 MPa to 30 MPa (step S72); performing an alignment step to align the anti-explosion layer 200 and the release member with the substrate 102 (step S73); performing a bonding step to bond the anti-explosion layer 200 and the release member to the substrate 102 to form a temporary structure (step S74); performing a post-processing step on the temporary structure (step S75); performing a post-processing step on the anti-explosion layer 200 and removing portions of the anti-explosion layer 200 extending beyond the substrate 102 (step S76); removing the temporary structure (step S77); performing an alignment step to align the substrate 102 and the anti-explosion layer 200 with the display 300 (step S78); performing a bonding step to bond the substrate 102 and the anti-explosion layer 200 to the display 300 to form the electronic device 20 (step S79); and performing the post-processing step on the electronic device 20 (step S80).

The manufacturing method 70A of the electronic device is substantially similar to the manufacturing method 50A of the electronic device. The main difference is that the manufacturing method 70A of the electronic device may further include two-stage alignment steps and two-stage bonding steps (step S73, step S74 and steps S77 to S79) and further include use of the release member to perform the alignment step and the bonding step. Steps S71, S72, S76 and S80 respectively are similar to steps S51, S52, S56 and S55 in the method 50A, and thus the description thereof will not be repeated here.

As described above, in this embodiment, the release member having release function may be used first to align the anti-explosion layer 200 and the substrate 102 (step S73). Specifically, the solid anti-explosion layer 200 may be placed between the substrate 102 and the release member, and the substrate 102 and the anti-explosion layer 200 may be aligned with the release member by a jig, for example, by a side edge alignment. In some embodiments, the release member may include a release substrate or a release film, such as a release glass, a polyethylene terephthalate (PET) board, an acrylic sheet, a polycarbonate (PC) board, but it is not limited thereto.

Next, the anti-explosion layer 200, the release member and the substrate that have been aligned may be bonded to form the temporary structure (step S74). The temporary structure may be used to temporarily fix the anti-explosion layer 200 with the release member and the anti-explosion layer 200. In some embodiments, the bonding step may include performing a heating step and/or a pressurization step on the anti-explosion layer 200, the release member, and the substrate 102 in a vacuum environment, so that the anti-explosion layer 200 may be gel-like and adhesive. In some embodiments, in the bonding step (step S74), the degree of vacuum may be in a range from 0 Pa to 100 Pa, the temperature may be in a range from 60° C. to 120° C., and the pressure may be in a range from 0.5 kgf/cm$^2$ to 5 kgf/cm$^2$.

In some embodiments, the degree of vacuum of the bonding step (step S74) may be in a range from 0 Pa to 60 Pa, for example, 10 Pa, 20 Pa, 30 Pa, 40 Pa, or 50 Pa. In some embodiments, the temperature of the bonding step may be in a range from 80° C. to 100° C., for example, 85° C., 90° C., or 95° C. In some embodiments, the pressure of the bonding step may be in a range from 1 kgf/cm$^2$ to 4 kgf/cm$^2$, for example, 1.5 kgf/cm$^2$, 2 kgf/cm$^2$, 2.5 kgf/cm$^2$, 3 kgf/cm$^2$, or 3.5 kgf/cm$^2$.

Next, as shown in step S75, the post-processing step may be performed on the bonded temporary structure. The post-processing step may remove the bubbles generated during the bonding step and make the bonding more compact. The post-processing step may include a heating step and/or a pressurization step. In some embodiments, the temperature of the heating step may be in a range from 70° C. to 150° C., and the pressure of the pressurization step may be in a range from 7 kgf/cm$^2$ to 15 kgf/cm$^2$. In some embodiments, the post-processing step may take from 20 minutes to 120 minutes.

In some embodiments, the temperature of the post-processing step performed on the temporary structure may be in a range from 90° C. to 140° C., for example, 100° C., 110° C., 120° C., or 130° C. In some embodiments, the pressure of the post-processing step may be in a range from 10 kgf/cm$^2$ to 14 kgf/cm$^2$, for example, 11 kgf/cm$^2$, 12 kgf/cm$^2$, or 13 kgf/cm$^2$. In some embodiments, the post-processing step may take from 40 minutes to 80 minutes, for example, 50 minutes, 60 minutes, or 70 minutes.

Next, as shown in step S77, the temporary structure may be removed. That is, the release member may be separated from the substrate 102 and the anti-explosion layer 200, leaving the substrate 102 and the anti-explosion layer 200 that have been aligned and bonded. Then, as shown in step S78 and step S79, the substrate 102 that has been bonded to the anti-explosion layer 200 may be further bonded and aligned with the display 300. Specifically, a charge coupled device (CCD) may be used to align the substrate 102 with the display 300, and the substrate 102 may be bonded to the display 300 by the anti-explosion layer 200 to form the electronic device 20. In some embodiments, in step S78, the substrate 102 may be aligned with the first polarizing plate 306a or the first substrate 302a of the display 300 (e.g., as shown in FIG. 3 or FIG. 4).

To summarize the above, in accordance with some embodiments of the present disclosure, the provided electronic device may include the anti-explosion layer having specific physical properties. Due to the cohesive force of the anti-explosion layer or the force between the anti-explosion layer and the cover plate, the risk of cracking and explosion of the cover plate when it is impacted can be reduced, and the safety of the electronic device can be improved. Furthermore, in accordance with some embodiments of the present disclosure, the provided electronic device can conform to vehicle safety regulations (e.g., the impact test for head of safety regulations of Economic Commission for Europe (ECE) R21).

Although some embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes an individual embodiment, and the claimed scope of the present disclosure also includes the combinations of the claims and embodiments. The features of the various embodiments can be used in any combination as long as they do not depart from the spirit and scope of the present disclosure. The scope of protection of present disclosure is subject to the definition of the scope of the appended claims.

What is claimed is:

1. An electronic device, comprising:
    a display;
    a substrate disposed on the display; and
    an anti-explosion layer disposed between the substrate and the display, wherein the anti-explosion layer has a tensile strength, and the tensile strength is in a range from 10 MPa to 30 MPa,
    wherein the anti-explosion layer has a first side and the substrate has a second side, and a distance between the first side and the second side is in a range from 0 mm to 0.3 mm,
    wherein the anti-explosion layer is in contact with the display and the substrate, the display is adhered to the substrate through the anti-explosion layer, and the anti-explosion layer has a peel adhesion, and the peel adhesion is in a range from 40 N/mm to 150 N/mm,
    wherein the anti-explosion layer comprises a first surface, a portion of the first surface is in contact with the display and another portion of the first surface is not in contact with the display has a roughness, and the roughness (Ry) is in a range from 10 μm to 40 μm.

2. The electronic device as claimed in claim 1, wherein an area of the anti-explosion layer is greater than an area of the display.

3. The electronic device as claimed in claim 1, wherein the display has a third side, the third side of the display shrinks inward compared to the first side of the anti-explosion layer.

4. The electronic device as claimed in claim 1, wherein an area of the anti-explosion layer is substantially equal to an area of the substrate.

5. The electronic device as claimed in claim 4, wherein a ratio of the area of the anti-explosion layer to the area of the substrate is in a range from 99.5% to 100%.

6. The electronic device as claimed in claim 1, wherein the anti-explosion layer has a haze, and the haze is in a range from 0% to 1%.

7. The electronic device as claimed in claim 1, wherein the anti-explosion layer comprises a heat-curing glue, a thermoplastic glue, or a combination thereof.

8. The electronic device as claimed in claim 1, further comprising a shielding layer disposed between the anti-explosion layer and the substrate.

9. A method for manufacturing the electronic device according to claim 1, comprising:
    providing a substrate and performing a first pre-processing step on the substrate;
    providing an anti-explosion layer and a display, wherein the anti-explosion layer has a tensile strength and the tensile strength is in a range from 10 MPa to 30 MPa;
    performing an alignment step to align the substrate and the anti-explosion layer with the display; and
    performing a bonding step to bond the substrate and the anti-explosion layer to the display to form the electronic device, wherein the anti-explosion layer is disposed between the substrate and the display.

10. The method for manufacturing an electronic device as claimed in claim 9, wherein in the bonding step, a degree of vacuum is in a range from 0 Pa to 100 Pa, a temperature is in a range from 60° C. to 120° C., and a pressure is in a range from 0.5 kgf/cm² to 5 kgf/cm².

11. The method for manufacturing an electronic device as claimed in claim 9, wherein the first pre-processing step comprises a laser cleaning process, an ultraviolet cleaning process, coating of a material modification layer, a detergent cleaning process, a plasma cleaning process, or a combination thereof.

12. The method for manufacturing an electronic device as claimed in claim 9, further comprising:
    performing a first post-processing step on the electronic device, the first post-processing step comprising a heating step and a pressurization step.

13. The method for manufacturing an electronic device as claimed in claim 12, wherein a temperature of the heating step is in a range from 70° C. to 150° C., and a pressure of the pressurization step is in a range from 7 kgf/cm² to 15 kgf/cm².

14. The method for manufacturing an electronic device as claimed in claim 9, further comprising:
    performing a second pre-processing step on the anti-explosion layer, the second pre-processing step comprising performing a heating step and a pressurization step on the anti-explosion layer in a vacuum environment.

15. The method for manufacturing an electronic device as claimed in claim 14, wherein in the second pre-processing step, a degree of vacuum is in a range from 0 Pa to 100 Pa, a temperature is in a range from 60° C. to 120° C., and a pressure is in a range from 0.5 kgf/cm² to 5 kgf/cm².

16. The method for manufacturing an electronic device as claimed in claim 9, further comprising:
    performing a second post-processing step on the anti-explosion layer to remove portions of the anti-explosion layer extending beyond the substrate.

17. An electronic device, comprising:
    a display comprising a polarizing plate;
    a substrate disposed on the display; and
    an anti-explosion layer disposed between the substrate and the polarizing plate, wherein the anti-explosion layer has a tensile strength, and the tensile strength is in a range from 10 MPa to 30 MPa,
    wherein the anti-explosion layer has a first side and the substrate has a second side, and a distance between the first side and the second side is in a range from 0 mm to 0.3 mm,
    wherein the anti-explosion layer is in contact with the polarizing plate and the substrate, and the display is adhered to the substrate through the anti-explosion layer, wherein the anti-explosion layer comprises a first surface, a portion of the first surface is in contact with the display and another portion of the first surface is not in contact with the display has a roughness, and the roughness (Ry) is in a range from 10 μm to 40 μm.

* * * * *